(12) United States Patent
Garcia

(10) Patent No.: US 12,414,622 B1
(45) Date of Patent: Sep. 16, 2025

(54) SURVIVAL WATER BOTTLE

(71) Applicant: Andrea Denise Garcia, Corvallis, OR (US)

(72) Inventor: Andrea Denise Garcia, Corvallis, OR (US)

( * ) Notice: Subject to any disclaimer, the term of this patent is extended or adjusted under 35 U.S.C. 154(b) by 0 days.

(21) Appl. No.: 18/671,739

(22) Filed: May 22, 2024

(51) Int. Cl.
| | | |
|---|---|---|
| *A45F 3/18* | (2006.01) | |
| *A47G 19/22* | (2006.01) | |
| *B26B 3/00* | (2006.01) | |
| *F21V 33/00* | (2006.01) | |
| A45F 3/00 | (2006.01) | |
| H02S 20/30 | (2014.01) | |

(52) U.S. Cl.
CPC ............ *A45F 3/18* (2013.01); *A47G 19/2255* (2013.01); *B26B 3/00* (2013.01); *F21V 33/008* (2013.01); *A45F 2003/003* (2013.01); *H02S 20/30* (2014.12)

(58) Field of Classification Search
CPC . A45F 3/18; A45F 2003/003; A47G 19/2255; B26B 3/00; F21V 33/008
USPC ........................... 206/217; 215/390, 386, 396
See application file for complete search history.

(56) References Cited

U.S. PATENT DOCUMENTS

| | | |
|---|---|---|
| 2,208,478 A | 7/1940 | Simons et al. |
| 8,011,816 B1 | 9/2011 | Janda |
| 8,365,907 B1 | 2/2013 | Mooney et al. |
| 10,021,956 B2 | 7/2018 | Clark |
| 10,750,842 B2 | 8/2020 | Sengupta et al. |
| 11,591,136 B2 | 2/2023 | Burt et al. |
| 11,608,215 B1 | 3/2023 | Giordano |
| 2011/0127283 A1* | 6/2011 | Delucia ................ B65D 25/22 220/754 |
| 2016/0152386 A1* | 6/2016 | Danielsson .......... B65D 51/222 215/217 |
| 2018/0170634 A1 | 6/2018 | Woodruff |
| 2020/0198838 A1* | 6/2020 | Leblanc ............ A47G 23/0241 |
| 2021/0229865 A1 | 7/2021 | Wang et al. |
| 2022/0041470 A1 | 2/2022 | Hu |
| 2022/0081150 A1 | 3/2022 | Reddy |
| 2023/0235989 A1* | 7/2023 | Martin ................ B65D 23/104 463/47.3 |
| 2023/0264887 A1* | 8/2023 | Munie .................... A45C 13/26 220/592.25 |

\* cited by examiner

*Primary Examiner* — Jacob K Ackun

(57) ABSTRACT

A survival water bottle. The water bottle has a detachable handle that includes a utility knife. The water bottle has a detachable cup that can also be used to store small equipment. The water bottle includes an inner lid that seals the water vessel. The water bottle includes a second lid with lights and a solar panel. The water bottle includes a paracord strap for carrying.

20 Claims, 6 Drawing Sheets

SURVIVAL WATER BOTTLE

FIELD OF THE INVENTION

The present invention relates generally to beverage containers. The present invention relates more specifically to multipurpose water bottles.

BACKGROUND OF THE INVENTION

A typical water bottle is only used to carry water. The water bottle cannot perform additional functions. A hiker needs to carry equipment in addition to the water bottle that takes up space and adds additional weight.

It is an objective of the present invention to provide a survival water bottle with multiple functions. It is an objective of the present invention to provide a compact solution for carrying a variety of survival equipment.

SUMMARY OF THE INVENTION

The present invention is a survival water bottle. The water bottle has a detachable handle that includes a utility knife. The water bottle has a detachable cup that can also be used to store small equipment, such as a fire starter, a mirror, a compass, a GPS receiver, a whistle, and/or a carabiner. The water bottle includes an inner lid that seals the water vessel. The water bottle includes a second lid with lights and a solar panel. The water bottle includes a paracord strap for carrying.

DETAILED DESCRIPTION OF THE INVENTION

All illustrations of the drawings are for the purpose of describing selected versions of the present invention and are not intended to limit the scope of the present invention.

Figure 1:
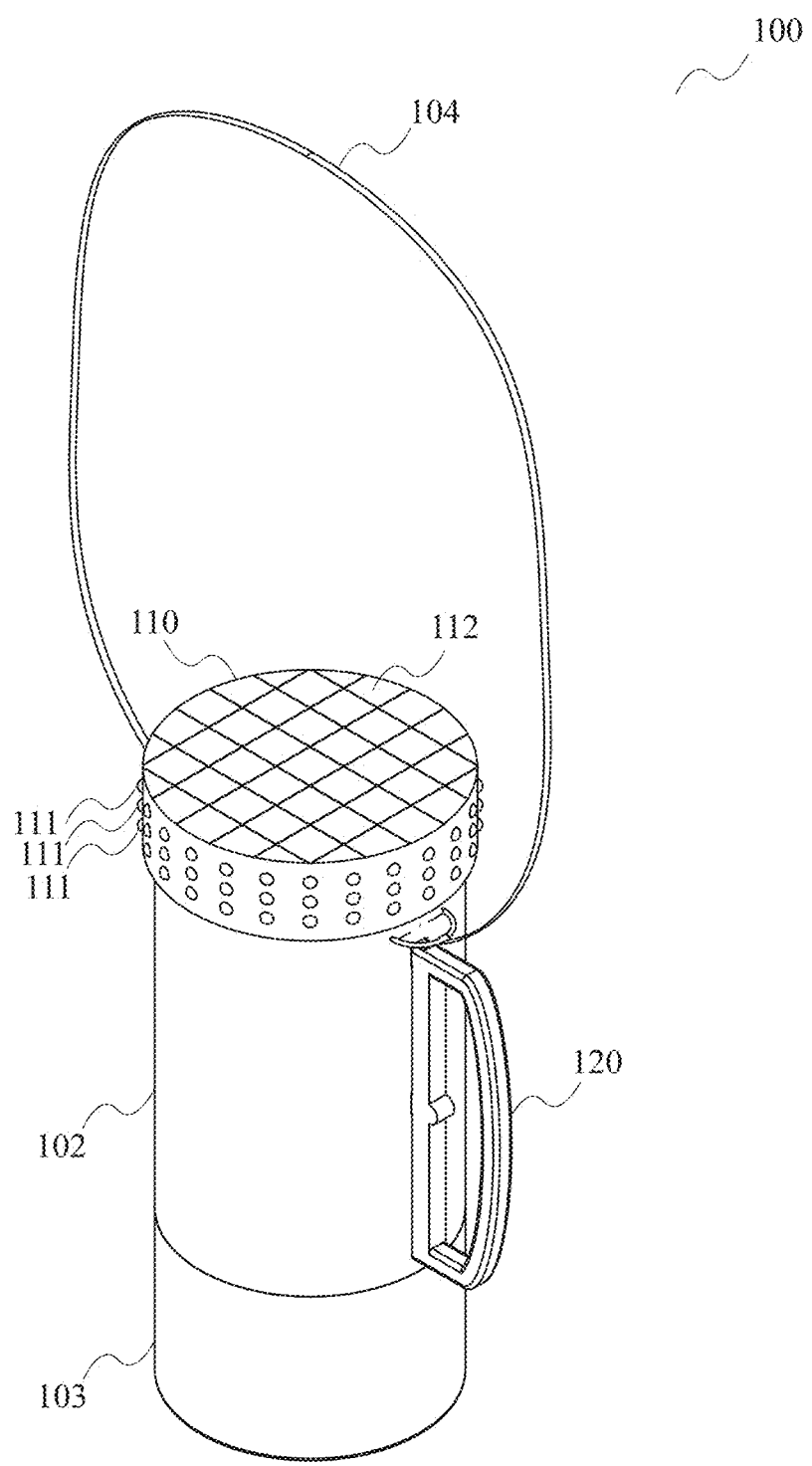
FIG. 1 is a perspective view of Embodiment 1 of the present invention.
Figure 2:
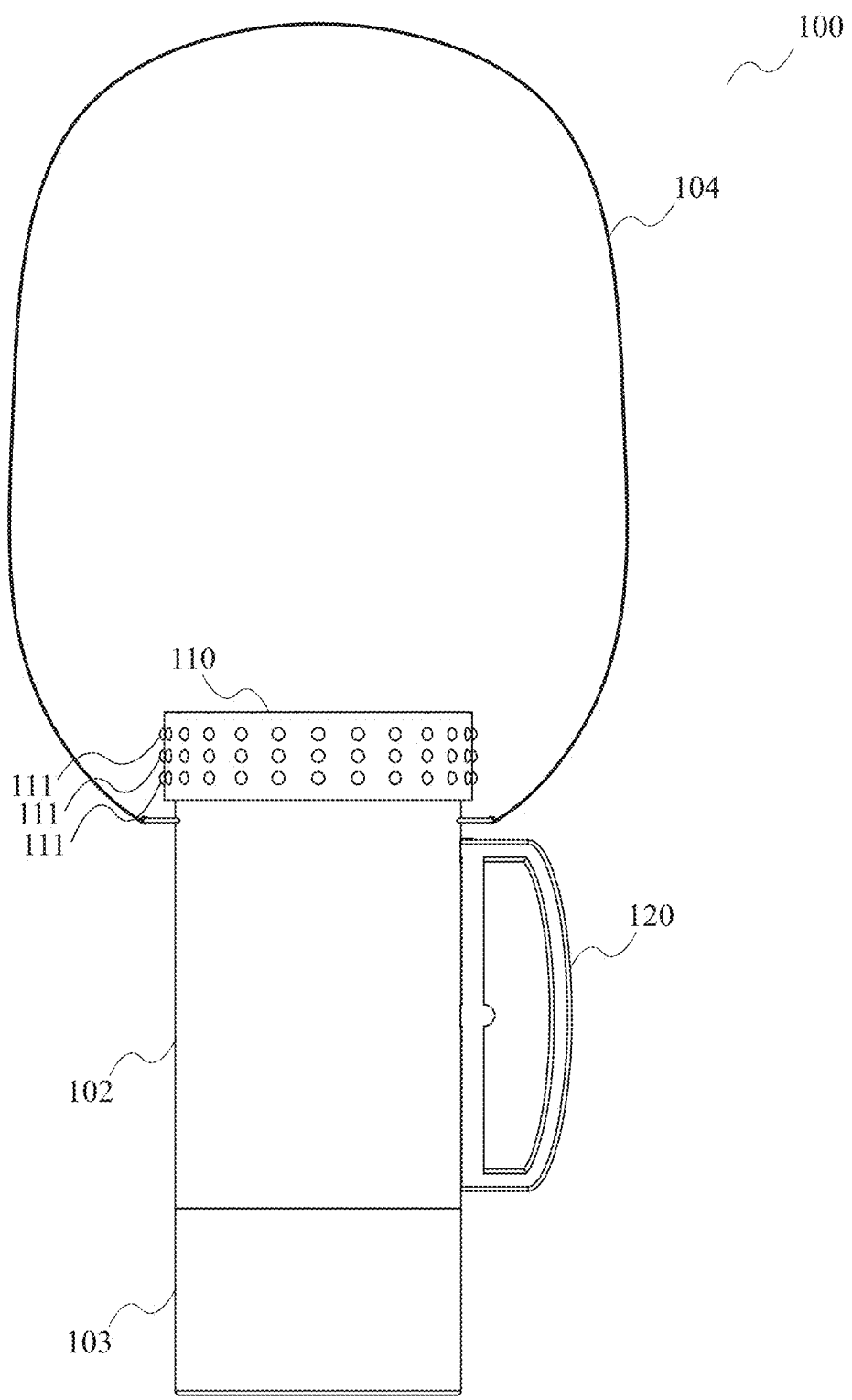
FIG. 2 is a front elevation view of Embodiment 1 of the present invention.
Figure 3:
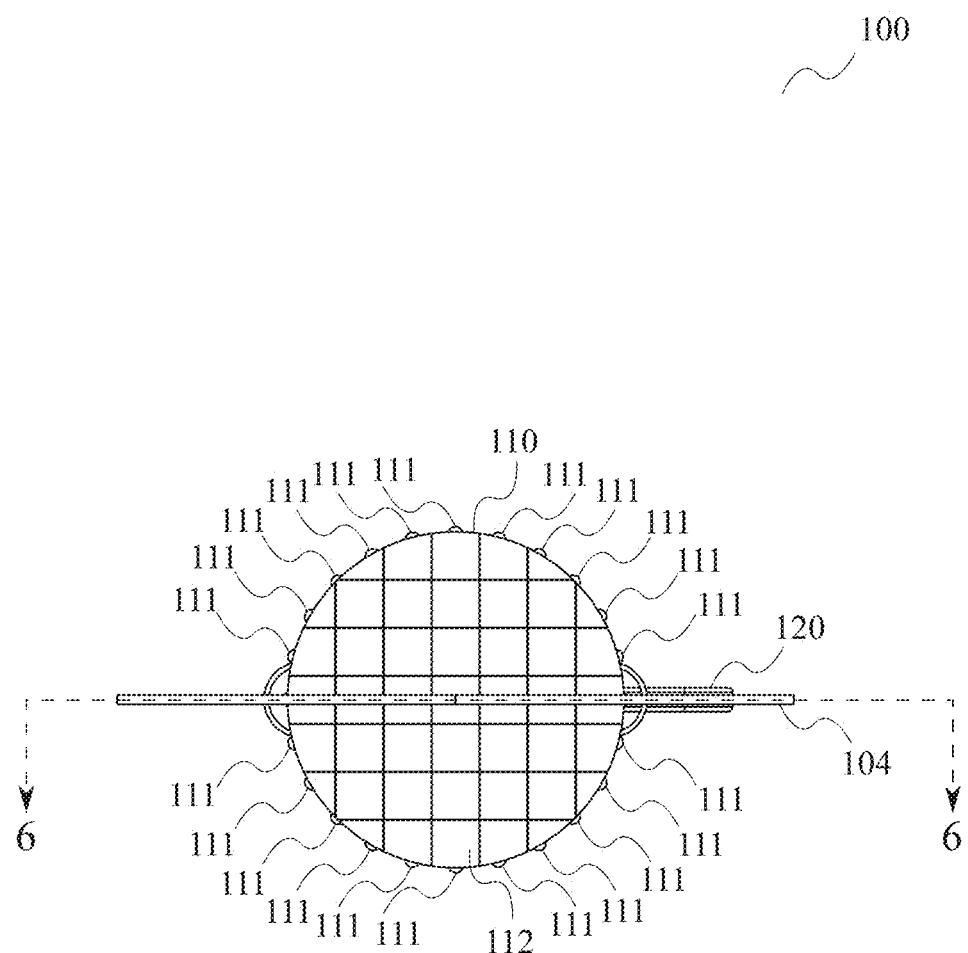
FIG. 3 is a top plan view of Embodiment 1 of the present invention in which a section plane is taken along line 6-6 and shown in FIG. 6.
Figure 4:
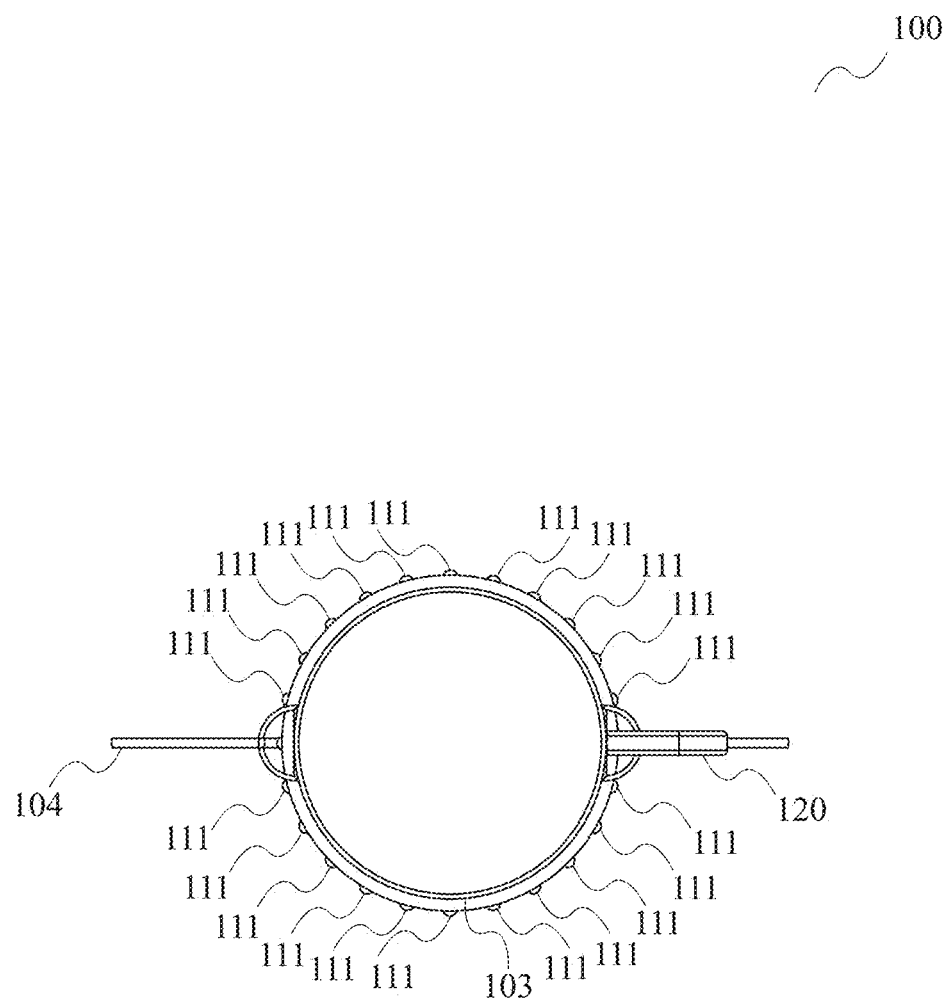
FIG. 4 is a bottom plan view of Embodiment 1 of the present invention.
Figure 5:
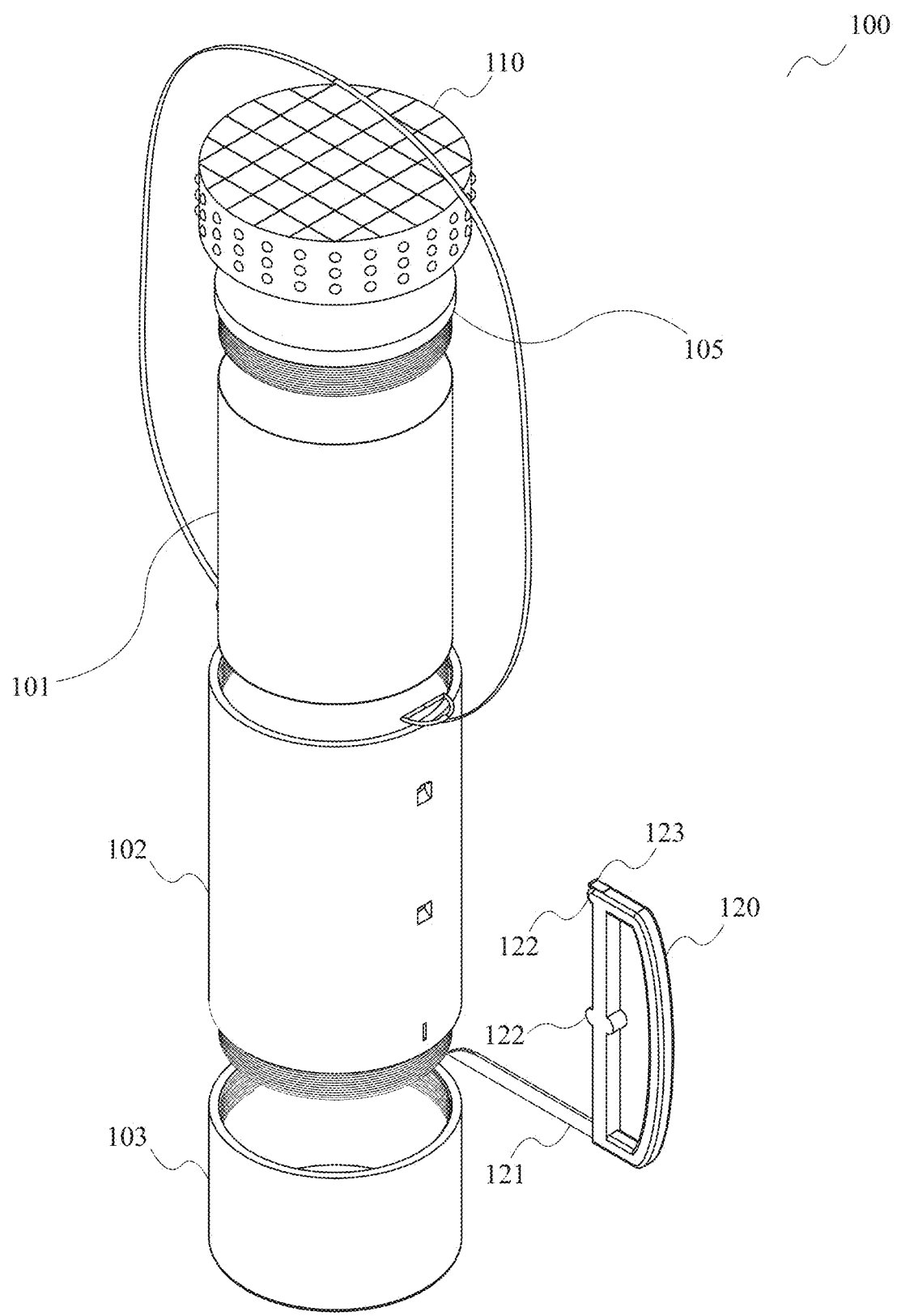
FIG. 5 is an exploded view of Embodiment 1 of the present invention.
Figure 6:
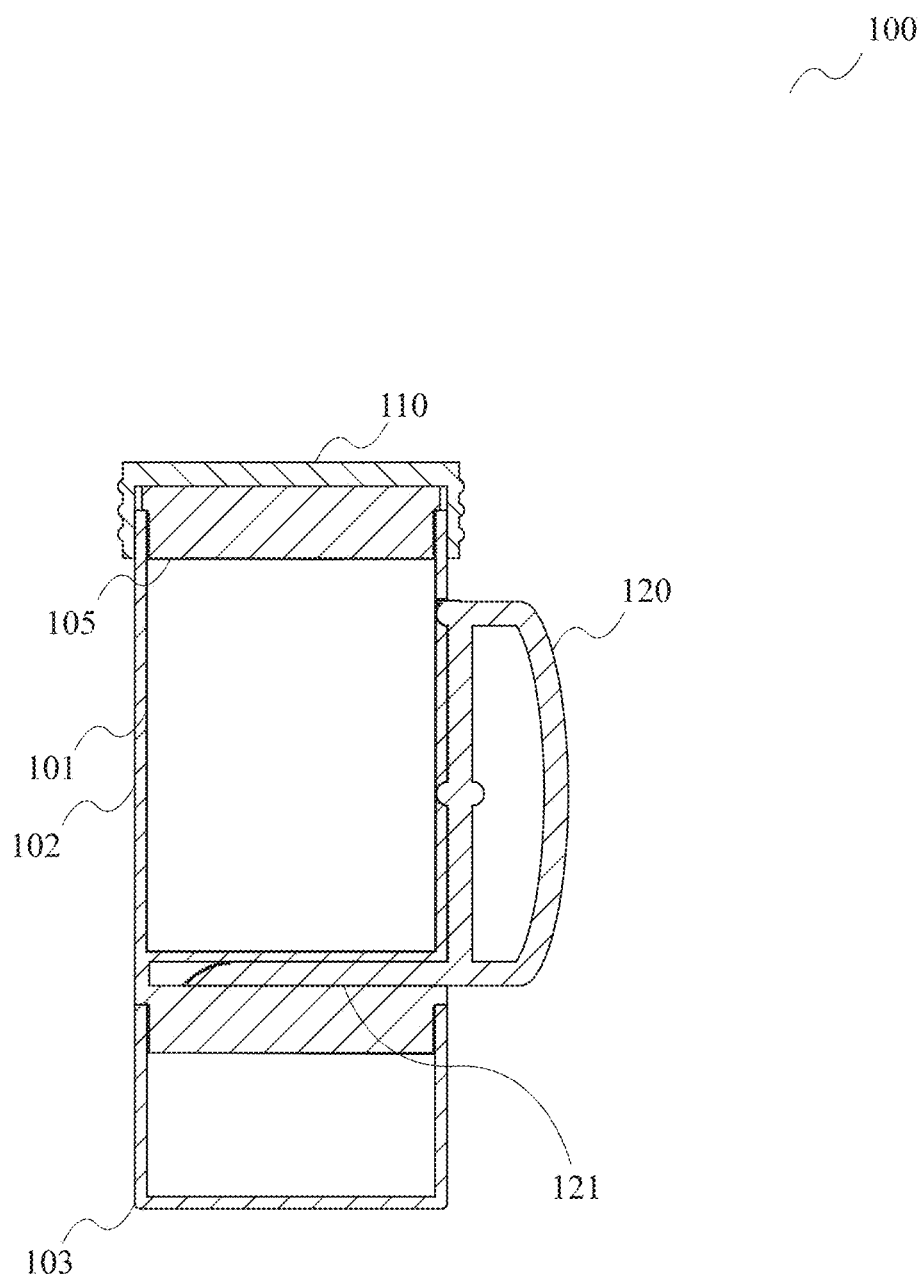
FIG. 6 is a sectional front of Embodiment 1 of the present invention taken along line 6-6 of FIG. 2.

Referring to FIGS. 1-6, the Embodiment 1 of the present invention comprises survival water bottle 100. The survival water bottle 100 comprises an internal container 101, an external container 102, a base 103, a strap 104, an internal lid 105, an external lid 110, and a handle 120. The internal container 101 and the external container 102 form the main body of the survival water bottle 100. The internal container 101 is a watertight vessel. In some embodiments, the internal container 101 is constructed from stainless steel. The internal container 101 is enclosed within the external container 102. In Embodiment 1, the internal container 101 is permanently enclosed within the external container 102. In some embodiments, the external container includes insulating material. The bottom of the external container 102 includes threads to connect to the base 103. The top of the external container 102 includes threads to connect to the internal lid 105. The external container 102 includes connectors to connect to the strap 104. The external container 102 includes connectors to connect to the connectors 122 of the handle 120. The external container includes a slot to receive the knife 121.

The base 103 forms a hollow compartment. The base 103 includes threads to connect to the bottom of the external container 102. The base 103 may be used as a cup to hold water. The base 103 may be used to store various survival equipment, such as a fire starter, a mirror, a compass, a GPS receiver, a whistle, and/or a carabiner.

The strap 104 is connected to the external container 102. The strap 104 may be used to carry the survival water bottle 100. In some embodiments, the strap 104 may be constructed from paracord material.

The internal lid 105 is a threaded lid that connects to the external container 102. The internal lid 105 seals the top of the internal container 101, preventing water from leaking out of the survival water bottle 100.

The external lid 110 fits over the internal lid 105 and the top of the external container 102. The external lid 110 includes lights 111 and a solar panel 112. The lights 111 are mounted around the side wall of the external lid 110. In Embodiment 1, the lights 111 are LED lights. The solar panel 112 is mounted to the top of the external lid 110. In Embodiment 1, the external lid 110 includes an internal battery that powers the lights 111 and is recharged by the solar panel 112. In some embodiments, the external lid 110 includes a power switch to operate the lights 111. The external lid 110 includes wires and circuits necessary to control and operate the lights 111, the solar panel 112, and the internal battery.

The handle 120 is removable from the survival water bottle 100. The handle 120 includes a knife 121. The handle 120 couples to the external container 102 via connectors 122 and the release 123. To remove the handle 120 from the external container 102, the release 123 is pressed, and the handle 120 disconnects from the external container 102.

Although the invention has been explained in relation to its preferred embodiment, it is to be understood that many other possible modifications and variations can be made without departing from the spirit and scope of the invention as hereinafter claimed.

What is claimed is:

1. A survival water bottle, comprising:
a container;
a lid;
a handle;
the handle further comprising a knife;
the lid removably connected to the container; and
the handle removably connected to the container.

2. The survival water bottle of claim 1, further comprising:
a detachable base;
the base further comprising a compartment; and
the base removably attached to the container.

3. The survival water bottle of claim 1, wherein the compartment further comprises a cup.

4. The survival water bottle of claim 1, further comprising:
an external lid;
the external lid removably connected to the container; and
the external lid enclosing the lid.

5. The survival water bottle of claim 4, wherein the external lid further comprises:

a plurality of lights;
a solar panel;
the plurality of lights disposed around a side will of the external lid;
the solar panel disposed on a top surface of the external lid; and
the plurality of lights electrically connected to the solar panel.

6. The survival water bottle of claim 1, wherein the container further comprises:
an internal container;
an external container; and
the internal container disposed within the external container.

7. The survival water bottle of claim 6, wherein the internal container comprises stainless steel.

8. The survival water bottle of claim 1, further comprising:
a strap; and
the strap connected to the container.

9. A survival water bottle, comprising:
a container;
a lid;
a base;
a handle;
the handle further comprising a knife;
the base further comprising a compartment;
the lid removably connected to the container;
the base removably connected to the container; and
the handle removably connected to the container.

10. The survival water bottle of claim 9, wherein the compartment further comprises a cup.

11. The survival water bottle of claim 9, further comprising:
an external lid;
the external lid removably connected to the container; and
the external lid enclosing the lid.

12. The survival water bottle of claim 11, wherein the external lid further comprises:
a plurality of lights;
a solar panel;
the plurality of lights disposed around a side will of the external lid;
the solar panel disposed on a top surface of the external lid; and
the plurality of lights electrically connected to the solar panel.

13. The survival water bottle of claim 9, wherein the container further comprises:
an internal container;
an external container; and
the internal container disposed within the external container.

14. The survival water bottle of claim 13, wherein the internal container comprises stainless steel.

15. The survival water bottle of claim 9, further comprising:
a strap; and
the strap connected to the container.

16. A survival water bottle, comprising:
an internal container;
an external container;
a base;
an internal lid;
an external lid;
a handle;
a knife;
the internal container disposed within the external container;
the base further comprising a compartment;
the base removably connected to the external container;
the internal lid removably connected to the external container;
the external lid removably connected to the external container;
the internal lid disposed within the external lid;
the handle removably connected to the external container; and
the knife disposed on the handle.

17. The survival water bottle of claim 16, wherein the compartment further comprises a cup.

18. The survival water bottle of claim 16, wherein the external lid further comprises:
a plurality of lights;
a solar panel;
the plurality of lights disposed around a side will of the external lid;
the solar panel disposed on a top surface of the external lid; and
the plurality of lights electrically connected to the solar panel.

19. The survival water bottle of claim 16, wherein the internal container comprises stainless steel.

20. The survival water bottle of claim 16, further comprising:
a. a strap; and
b. the strap connected to the external container.

* * * * *